(12) United States Patent
Roy

(10) Patent No.: US 11,249,946 B2
(45) Date of Patent: Feb. 15, 2022

(54) PATH NAME CACHE FOR NOTIFICATIONS OF FILE CHANGES

(71) Applicant: EMC IP Holding Company LLC, Hopkinton, MA (US)

(72) Inventor: Dipankar Roy, San Jose, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 139 days.

(21) Appl. No.: 15/977,575

(22) Filed: May 11, 2018

(65) Prior Publication Data

US 2019/0347337 A1 Nov. 14, 2019

(51) Int. Cl.
| | |
|---|---|
| *G06F 16/16* | (2019.01) |
| *G06F 3/06* | (2006.01) |
| *G06F 12/123* | (2016.01) |
| *G06F 16/13* | (2019.01) |
| *G06F 16/17* | (2019.01) |

(52) U.S. Cl.
CPC .............. *G06F 16/16* (2019.01); *G06F 3/067* (2013.01); *G06F 12/123* (2013.01); *G06F 16/13* (2019.01); *G06F 16/1734* (2019.01)

(58) Field of Classification Search
CPC ........................................ G06F 16/16
USPC .......................................... 707/821
See application file for complete search history.

(56) References Cited

U.S. PATENT DOCUMENTS

| | | | |
|---|---|---|---|
| 6,928,466 B1 * | 8/2005 | Bulka ................. | G06F 16/9574 709/213 |
| 8,171,227 B1 * | 5/2012 | Goldschmidt ...... | H04L 67/2852 711/136 |
| 2017/0199889 A1 * | 7/2017 | Jiao ....................... | G06F 16/172 707/707 |

* cited by examiner

*Primary Examiner* — Alexandria Y Bromell
(74) *Attorney, Agent, or Firm* — Amin, Turocy & Watson, LLP

(57) ABSTRACT

Change notify responses can be utilized to inform a remote computer that a file or directory that is being monitored has changed. A change notify response can include a path name to the file or directory being referenced. In some examples, a cache of path names can be maintained in a user space of a server implementing change notify responses. When a module that generates a change notify response does generate such a response, the module can first access the cache to determine if the relevant path name is located in the cache. Where the relevant path name is not located in the cache, the module can obtain the path name from kernel space and store it in the cache.

20 Claims, 8 Drawing Sheets

US 11,249,946 B2

PATH NAME CACHE FOR NOTIFICATIONS OF FILE CHANGES

TECHNICAL FIELD

The present application relates generally to techniques for changing computer files stored in computer file systems, and more specifically, to notifying one or more computers that a file stored in a computer file system has been changed.

BACKGROUND

A distributed storage system generally is a form of computer data storage that can provide remote data storage and access to one or more client computers. In some embodiments, multiple users or client computers can have access to alter at least some of the data stored in the distributed storage system.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
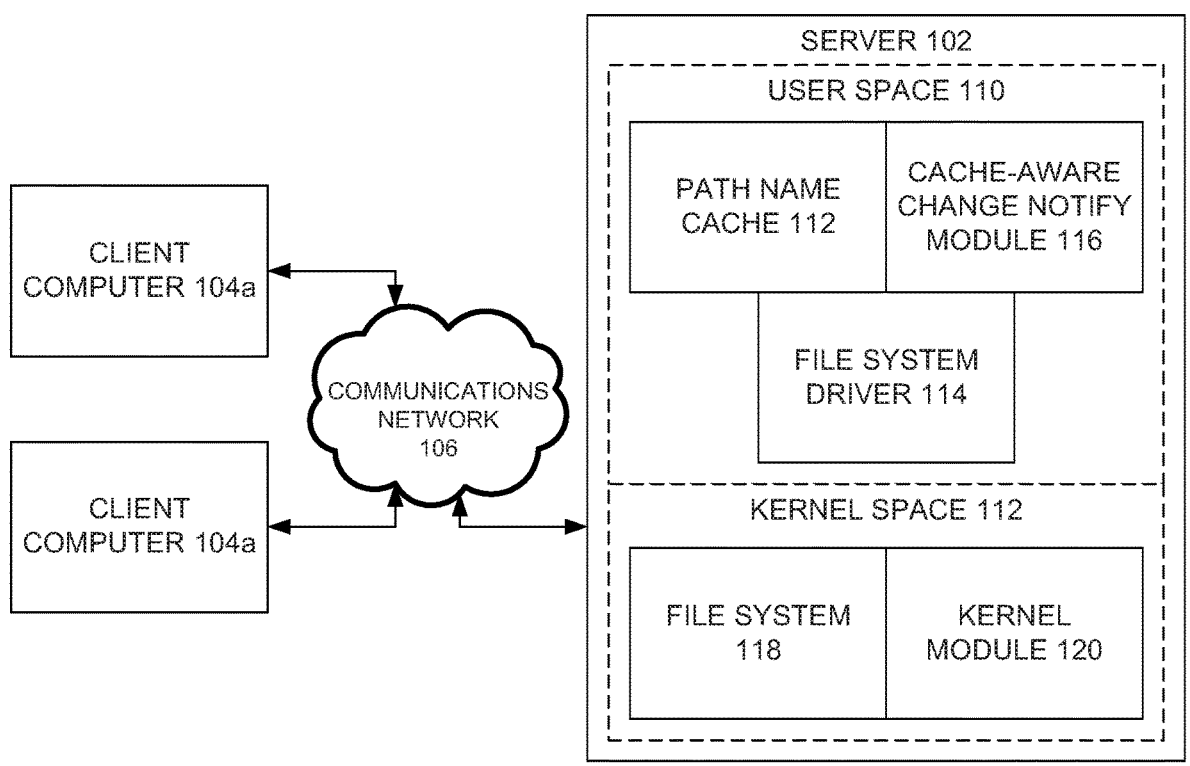
FIG. 1 illustrates a block diagram of an example system that can facilitate a path name cache for notifications of file changes, in accordance with certain embodiments of this disclosure.

As described herein, a distributed storage system can have an operating system. The operating system can provide updates to one or more remote computers about changes to files in the distributed storage system, using an application-layer network protocol. The present disclosure generally describes embodiments where the distributed storage system can be an EMC Isilon Cluster distributed storage system; the operating system can be a OneFS operating system (and file system); the application-layer network protocol can be a Server Message Block (SMB) application-layer network protocol; and changes to files are conveyed across the SMB application-layer network protocol with a change notify response (sometimes referred to as a CHANGE_NOTIFY response). It can be appreciated that there are other embodiments that utilize different technologies than described herein.

A SMB change notify response can be a type of computer message to a remote computer that indicates that a file or directory being monitored has been changed (e.g., created, modified, renamed, or deleted). A SMB change notify response can include the name of a file and/or directory that is being monitored. In a OneFS operating system, kernel events can be generated with a logical Mode (LIN) number and event mask. An inode can comprise a file system data structure that stores some information about a corresponding file, such as attributes for a file, disk block location(s) for the file, permissions for the file, and times of last change, access, and modification for the file. A LIN can then be a numerical value that identifies a particular Mode within a file system.

A OneFS file system driver can make a lin_get_path( ) application programming interface (API) call from user space into a OneFS kernel file system in kernel space to translate a LIN to a path name to a file and/or directory (e.g., /home/username/bin/). Upon determining a path name to the file and/or directory, the OneFS file system driver can construct a change notify response by inserting a corresponding path into a response buffer.

There can be problems involved with creating a change notify response in this manner. One problem with creating a change notify response in this manner is that, after a delete event, a lin_get_path( ) API call can return an indication that there is no such file or directory (sometimes referred to as Error No Entry, or ENOENT) from the kernel, since the LIN could get purged from a vnode cache of the file system in the interval between receiving the delete event and performing the lin_get_path( ) API call, especially when there are a large number of delete events happening at the same time. This can cause the change notify response to produce an error of "path unavailable error." This error produced by the change notify response can cause client applications to fail. To overcome this problem with a delete event and a change notify response, path information for the file and/or directory can be preserved until after the delete response has been sent out to a computer that is to receive the change notify response.

A second problem with creating a change notify response in the manner described above is that making a lin_get_path( ) API call can be expensive in terms of computer resources, since the API call can involve context switching between user space and kernel space, and then acquiring locks on a parent directory for the file, as well as the file inside the kernel. For a load with a large number of create, modify, or delete events happening in a short amount of time, there can be a significant performance bottleneck due to a large number of lin_get_path( ) API calls being generated.

As described herein, an approach to address these problems with creating a change notify response as described above involves creating a pathname cache in user space that is tied to a notify handler in the file system driver, and which is used to look up path names for change notify responses. The path name cache can contain a LIN-to-path-name translation for files and/or directories. This cache can be utilized to look up entries, which addresses both a problem of querying after delete and a problem of performance.

Correctness of the cache can be maintained where the kernel notifies a user space notify event handler if a LIN to path name mapping changes because of a delete or rename operation.

The cache is queried before performing a lin_get_path( ) operation in a OneFS change notify driver. If the LIN does not exist in the cache, then a lin_get_path( ) API call can be made to retrieve the path from the kernel. If the operation is to create or modify, the cache can be populated with the LIN and corresponding path name. So as to mitigate against the contents of the cache from becoming stale, a delete or rename event can involve removing a corresponding entry from the cache. For a delete event, the corresponding entry is deleted from the cache after the path name is retrieved from the cache for the purpose of constructing a change notify response. Therefore, a lin_get_path( ) API call can be avoided for a delete event if the cache contains the path name for the LIN.

For a rename event, the entry can be removed from the cache, since a subsequent lin_get_path( ) API call to the kernel can return a new path name for the LIN. Removing an entry from a cache as a result of a rename event can ensure that a change notify response does contain a correct path name after a rename.

The cache can be implemented as a least-recently used (LRU) data structure, with a limited set of entries. When the cache is full, a least-recently used entry can be removed from the cache to make room for a new entry.

Example Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example system that can facilitate a path name cache for notifications of file changes, in accordance with certain embodiments of this disclosure. System 100 comprises server 102, client computer 104a, client computer 104b, and communications network 106. Each of client computer 104a and client computer 104b can be implemented using aspects of computer 802 of FIG. 8. Communications network 106 can comprise a computer communications network, such as the Internet.

Figure 7:
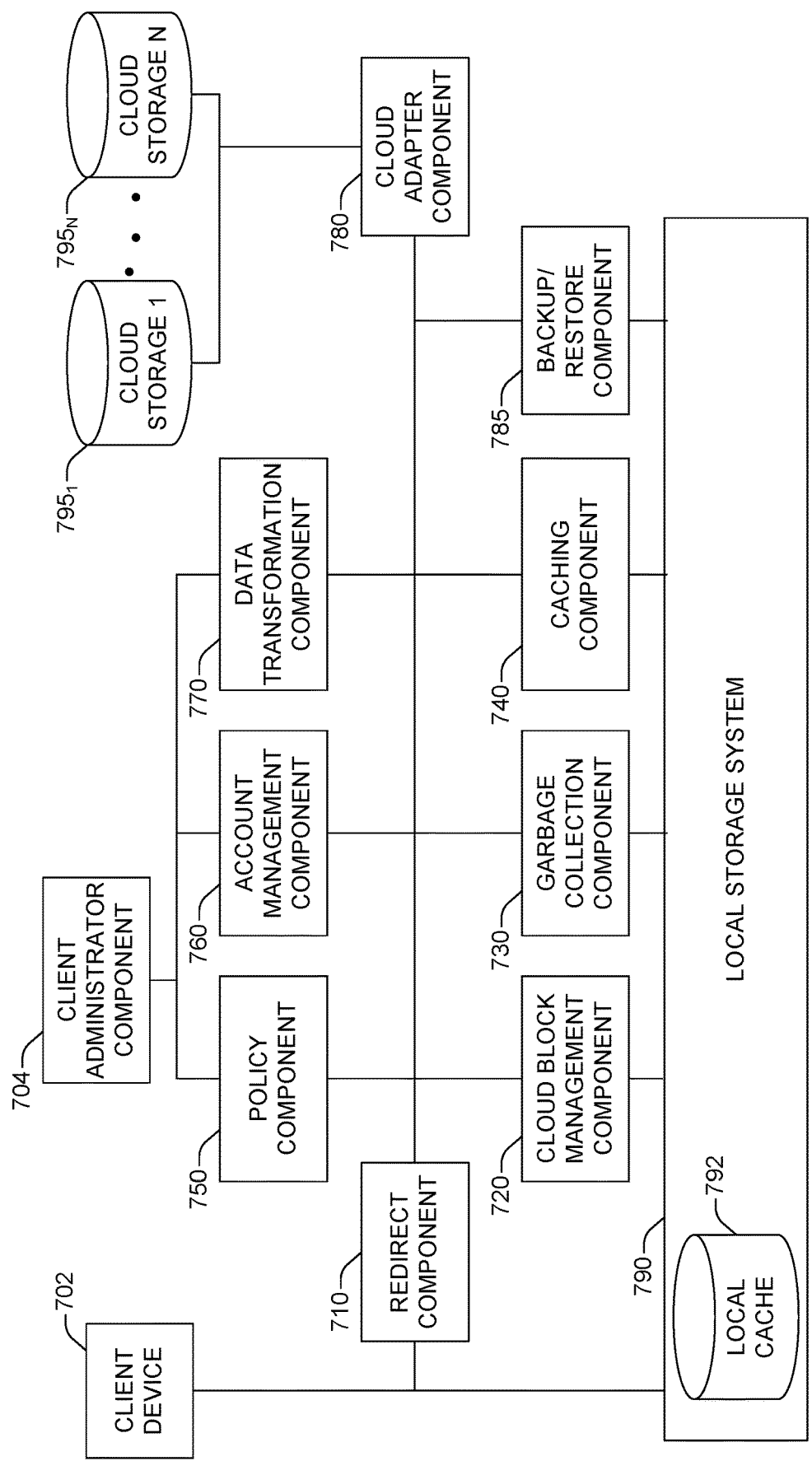
FIG. 7 illustrates a block diagram of an example distributed file storage system that employs tiered cloud storage in accordance with certain embodiments of this disclosure.
Figure 8:
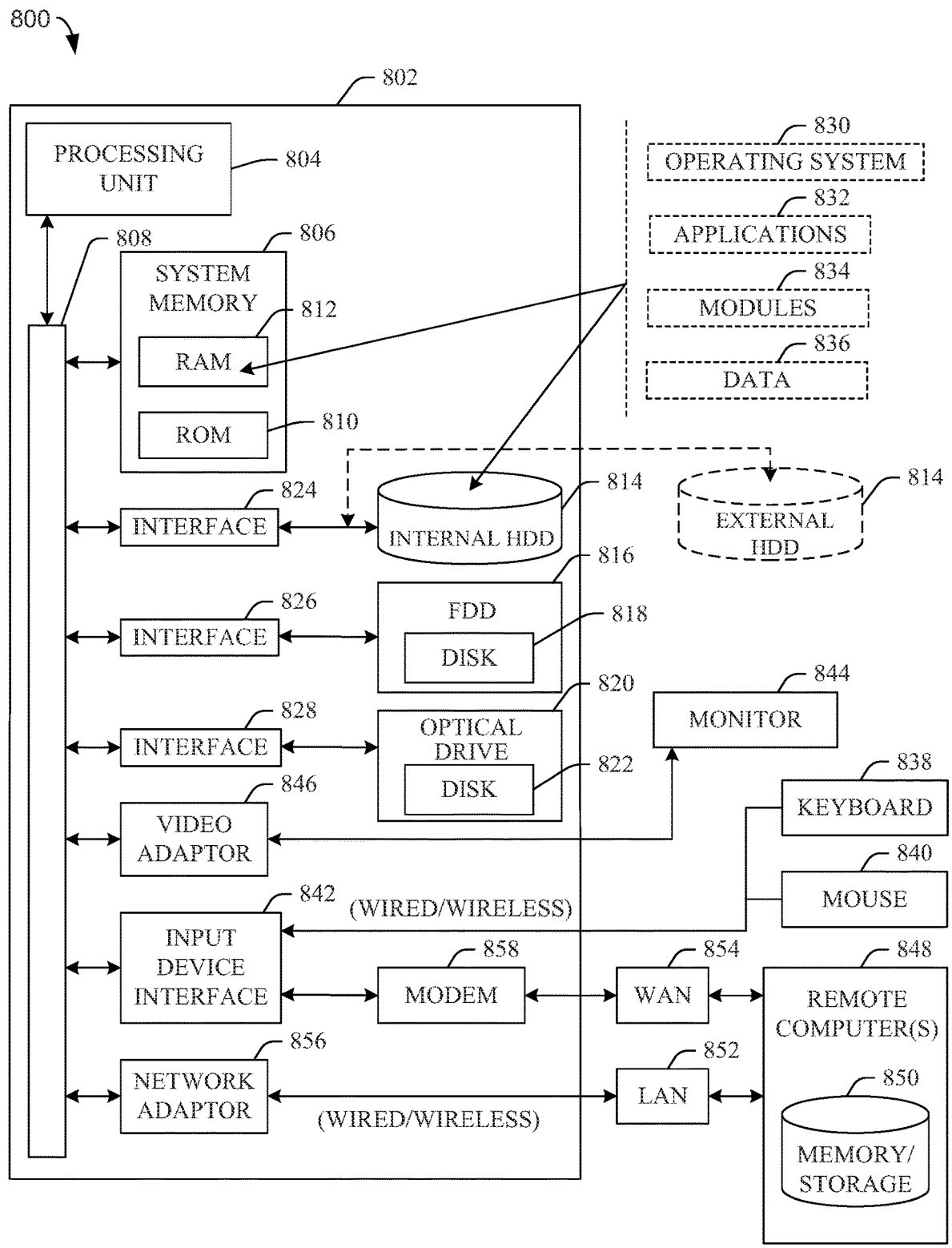
FIG. 8 illustrates an example block diagram of a computer operable to execute certain embodiments of this disclosure.

Server 102 can be implemented using aspects of distributed file storage system 700 of FIG. 7 and computer 802 of FIG. 8. It can be appreciated that server 102 is presented logically, and that there can be embodiments where server 102 comprises multiple computers. In some examples, server 102 can implement a OneFS operating system.

As depicted, server 102 comprises user space 108, kernel space 110, path name cache 112, file system driver 114, cache-aware change notify module 116, file system 118, and kernel process 120. User space 108 can generally be a portion of system memory of server 102 in which user processes run. Then, kernel space 110 can generally be a portion of system memory of server 102 in which kernel processes run. Path name cache 112 can comprise a cache that stores LINs (which serve as a key to the cache) and corresponding path names for a file or directory, and can be implemented with aspects of cache 200 of FIG. 2A, cache 220 of FIG. 2B, and/or cache 240 of FIG. 2C.

File system driver 114 can comprise a computer device driver that provides access to a file system (in which files and/or directories for which change notify responses can be produced can be stored) of server 102 to one or more applications or modules of server 102, such as cache-aware change notify module 116. Cache-aware change notify module 116 can create and send change notify responses to client computer 104a and/or client computer 104b. File system 118 can comprise an organization of data on server 102 into one or more files and/or directories that can contain files. Kernel module 120 can provide some operating system functions for server 102, such as file management and resource allocation.

Server 102 can store and maintain one or more computer files, which can, in turn, be accessed by client computer 104a and/or client computer 104b. Client computer 104a and/or client computer 104b can access these files on server 102 via a SMB protocol. In some examples, server 102 can send client computer 104a and/or client computer 104b a change notify response when one or more particular files or directories are changed on server 102 (e.g., when the file or directory is created, modified, renamed, or deleted).

Cache-aware change notify module 116 can receive an indication to monitor one or more files or directories for one or more computers (sometimes referred to as registering for an event), where these files and directories are stored in file system 118 and upon determining that a monitored file or directory has been changed. For example, client computer 104a can have registered a request to monitor the changes of a particular file that is stored in file system 118. Then, client computer 104b can change that same file. Upon determining that the file has been changed, cache-aware change notify module 116 can use a LIN for the file to look up a path name for the file in path name cache 112, and use that path name retrieved from path name cache 108 to create a change notify response that cache-aware change notify module 116 then sends to client computer 104a (e.g., in accordance with a SMB protocol). There can be examples where cache-aware change notify module 116 has access to the LIN for the file without having access to the path name for the file, such as because a file change event that cache-aware change notify module 116 becomes aware of and prompts generating a change notify response identifies the associated file by its LIN without identifying the file's path name.

As depicted, kernel process 120 can be responsible for receiving file change events and implementing those events (e.g., deleting a file). Then, cache-aware change notify module 116 can determine that such a file modification has been made or will be made, and create and issue a change notify response accordingly.

Figure 3:
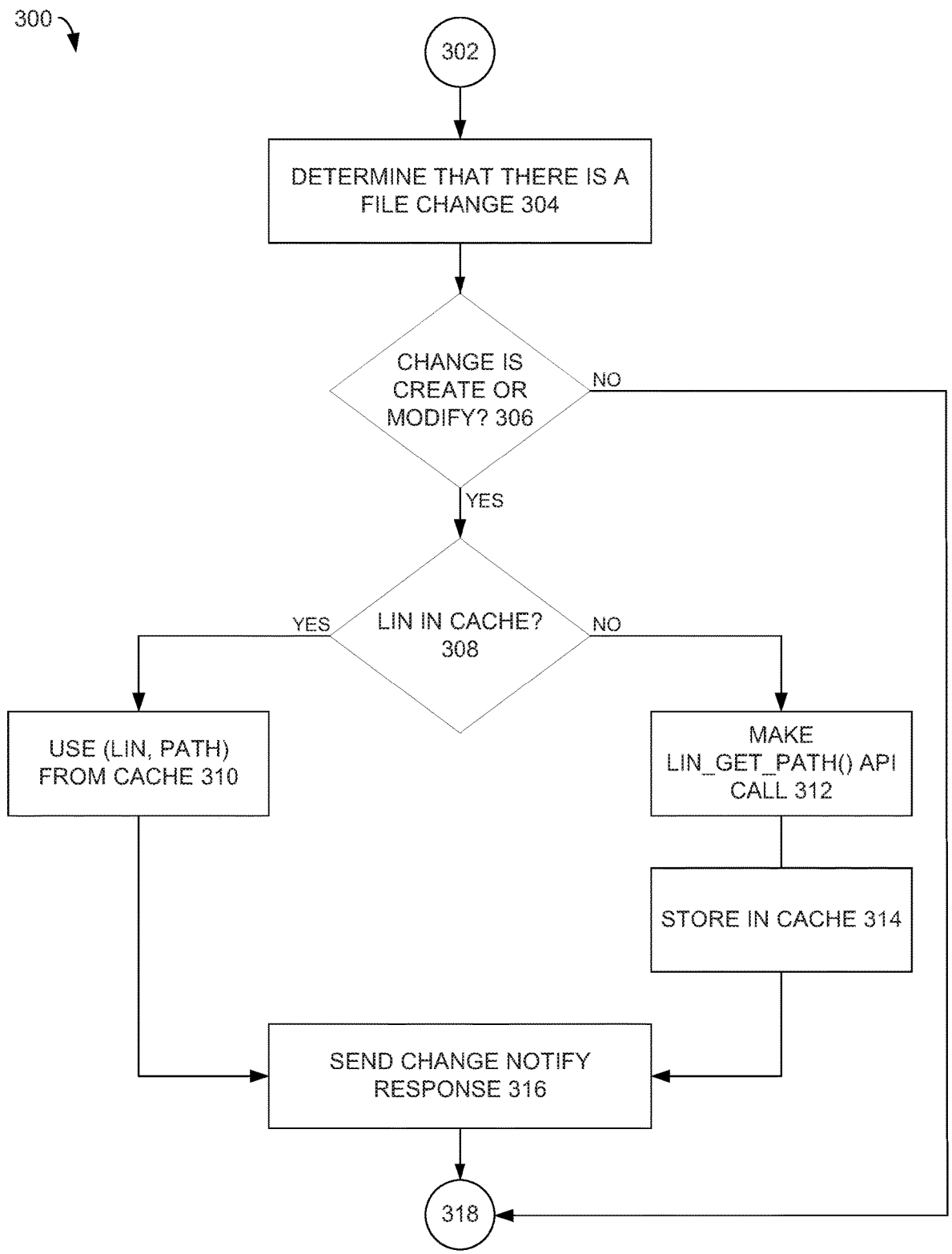
FIG. 3 illustrates an example process flow for providing a change notify response for a file create or modify, in accordance with certain embodiments of this disclosure.
Figure 4:
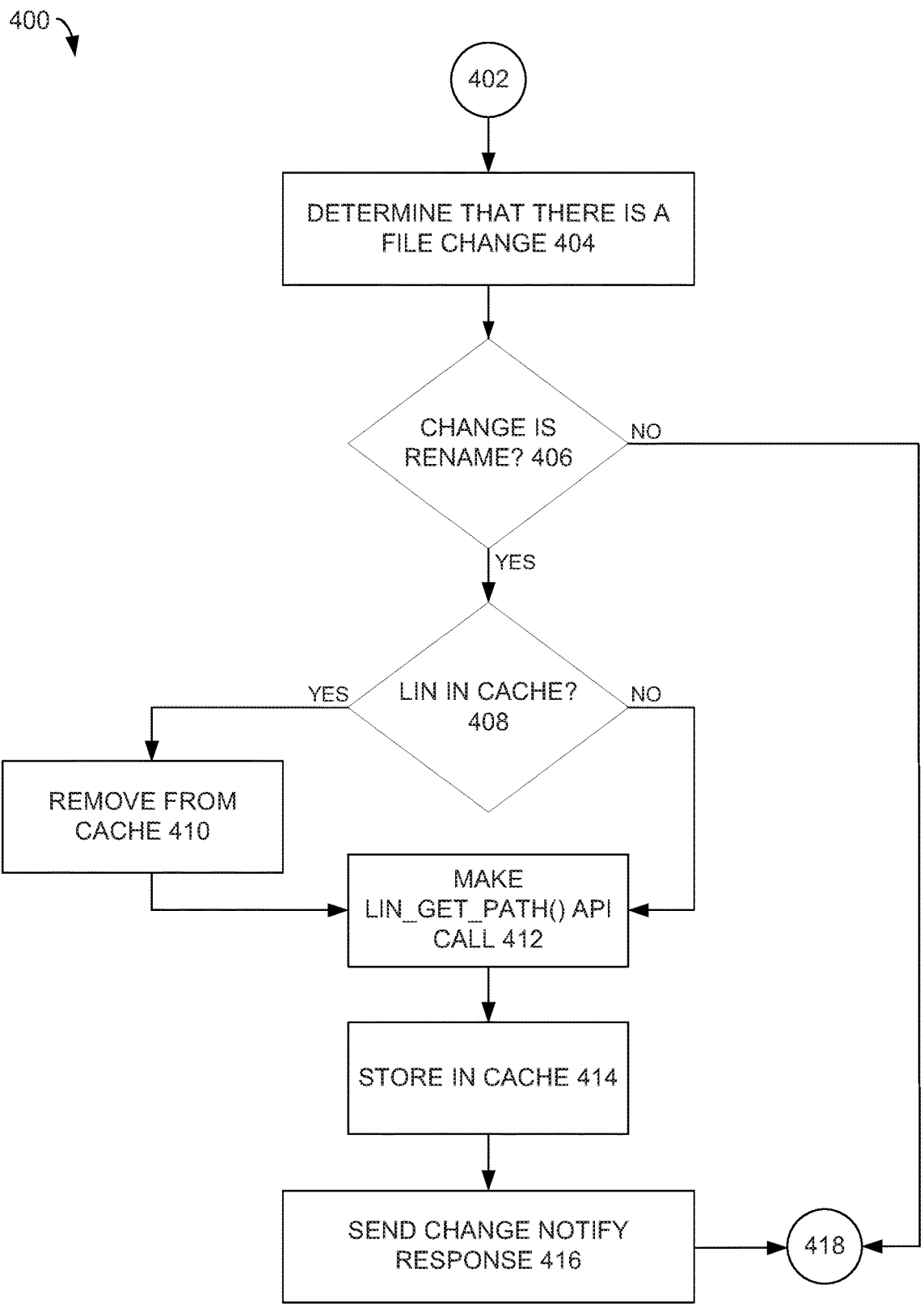
FIG. 4 illustrates an example process flow for providing a change notify response for a file rename, in accordance with certain embodiments of this disclosure.
Figure 5:
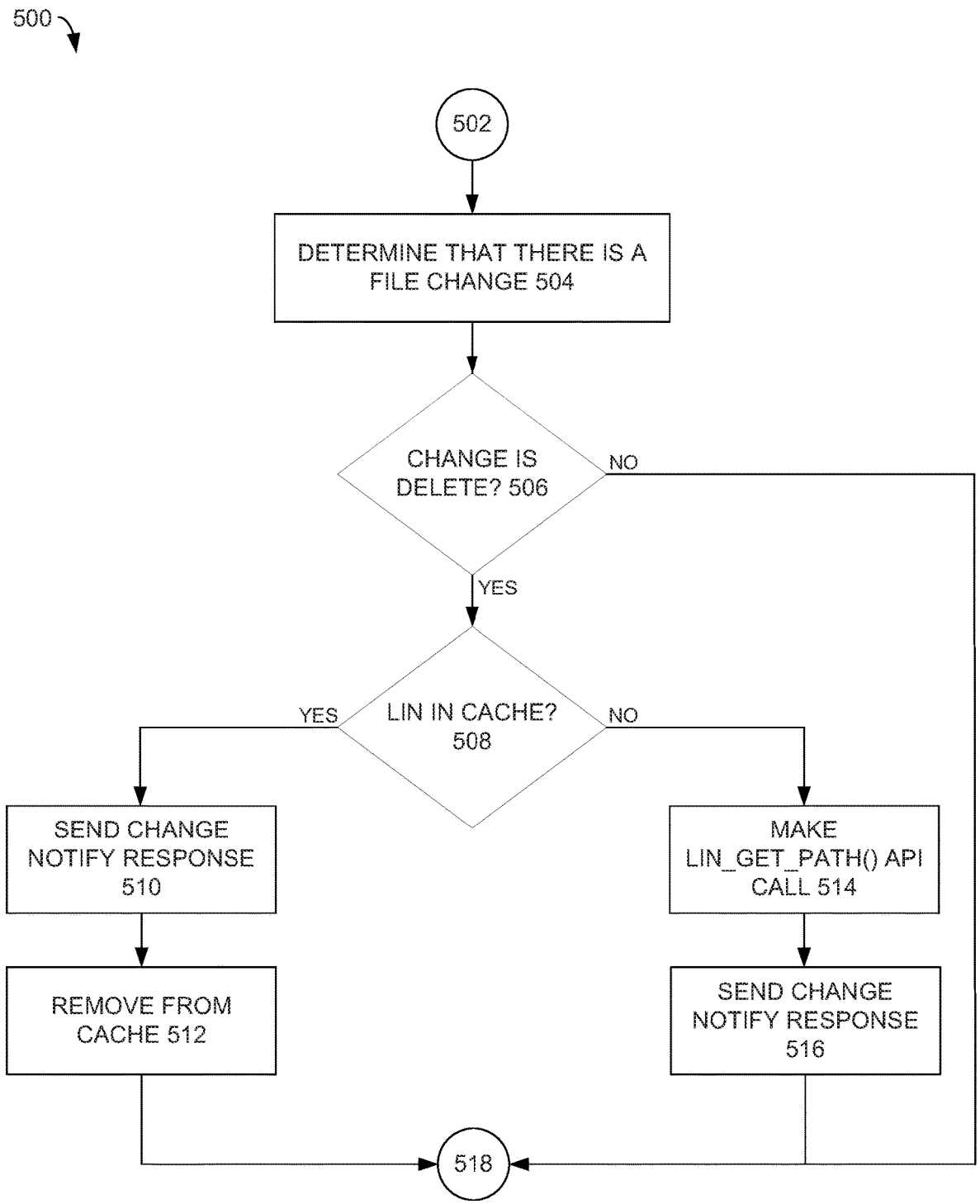
FIG. 5 illustrates an example process flow for providing a change notify response for a file delete, in accordance with certain embodiments of this disclosure.
Figure 6:
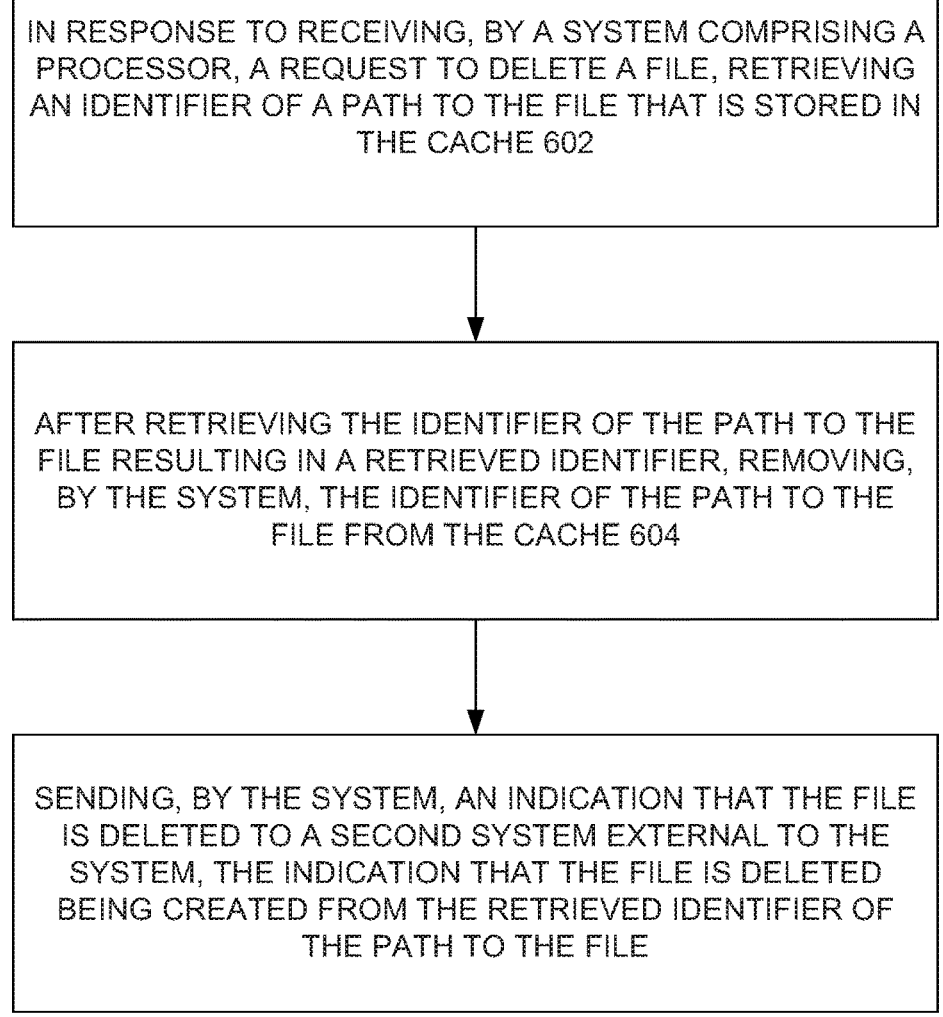
FIG. 6 illustrates an example process flow for a path name cache for notifications of file changes, in accordance with certain embodiments of the disclosure.

Cache-aware change notify module 116 can implement aspects of process flow 300 of FIG. 3, process flow 400 of FIG. 4, process flow 500 of FIG. 5, and process flow 600 of FIG. 6. Cache-aware change notify module 116 can utilize path name cache 108 in different ways depending on the type of change (e.g., create, modify, rename, or delete), and whether an entry for the file or directory being changed is already located in path name cache 108.

In general, where cache-aware change notify module 116 attempts to retrieve a path name for a particular file from path name cache 108, and there is no corresponding entry, Cache-aware change notify module 116 can invoke a request to file system driver 114 for the path to the file (such as by invoking a lin_get_path( ) API call). File system driver 114 can then contact kernel module 120 regarding the API call, and kernel module 120 can determine a path name in file system 118 that corresponds to the LIN (where using a lin_get_path( ) API call), and return that path name to file system driver 114, which can return the path name to cache-aware change notify module 116. Cache-aware change notify module 116 can then store an entry for the path name in path name cache 108 (such as via a (LIN, path name) pair, where the LIN can serve as a key to look up the path name), as well as create and send a change notify response that identifies the path name.

Figure 2A:
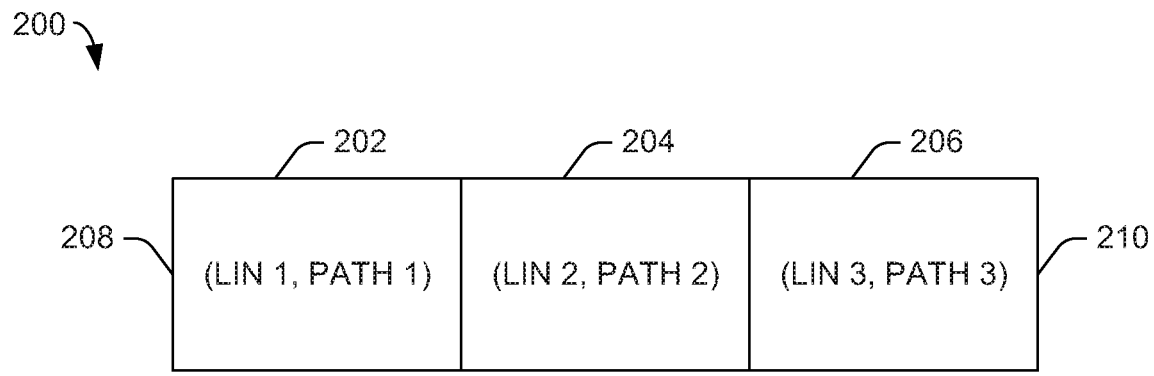
FIG. 2A illustrates an example cache that can facilitate a path name cache for notifications of file changes, in accordance with certain embodiments of this disclosure.

FIG. 2A illustrates an example cache that can facilitate a path name cache for notifications of file changes, in accordance with certain embodiments of this disclosure. In some examples, cache 200 can be used to implement path name cache 112 of FIG. 1. Cache 200 is depicted as containing three cache entries: cache entry 202, cache entry 204, and cache entry 206. Each of cache entries 202-206 stores a pair containing a LIN for a file or directory, and the path name for that file or directory. The LIN in each cache entry can serve as a key for the cache—that is each LIN can be unique among LINs in the cache, and a LIN is used to look up the corresponding path name in the cache (which can then be utilized to create a change notify response).

One way that cache 200 can be constructed is as a least-recently used (LRU) cache (and there can be other types of caches or data storage structures that can be implemented to facilitate a path name cache for notifications of file changes). A LRU cache can allow for a finite number of cache entries. As depicted, the finite number of cache entries allowed in cache 200 is three, and it can be appreciated that there can be embodiments that allow for different numbers of entries, such as 512 entries.

In a LRU cache, when the cache is full (i.e., it is storing its maximum number of entries), and a new cache entry is added (e.g., as a result of a file being changed when there is not a corresponding entry in the cache for that file), then the least-recently used cache entry is removed to make room for this new cache entry in the LRU cache. There are various ways in which the least-recently used cache entry can be determined. In one embodiment, cache entries can contain a timestamp or other indication of when they have been accessed relative to other cache entries. In another embodiment, as depicted with cache 200, the cache entries can be ordered by when they have been used. Here, cache entry 202 has been most recently used, followed by cache entry 204, and then cache entry 206 is the least-recently used cache entry in cache 200. Thus, when space in cache 200 is needed for a new cache entry, cache entry 206 will be removed to make space in cache 200.

As depicted, cache 200 contains a front 208 and a back 210. New entries (or existing entries that are accessed) are moved to a position at front 208, with the other cache entries moved one spot away from front 208 to make room for this new entry or accessed entry. Then, if cache 200 is full (as depicted here, where cache 200 has a maximum size of three cache entries and is also storing three cache entries) and a new cache entry is being added to cache 200, then a cache entry located at back 210 can be removed from cache 200 to make room for the new cache entry.

It can be appreciated that the depiction of cache 200 (and cache 210 in FIG. 2B and cache 220 in FIG. 2C) is a logical depiction, and that there can be various embodiments of how a cache is implemented. For example, in some embodiments, a cache can be implemented with a combination of a doubly-linked list and a hash. With the doubly-linked list (which can be a series of nodes that can store data, where nodes can have a pointer to each of a previous entry and a next entry in the list), each entry in the doubly linked list can contain a path name for a file or a directory. Then, a hash can be maintained for LINs, where a LIN in the hash points to a node in the doubly-linked list. When provided with a LIN, the hash can be accessed for that LIN, which can point to a node in the doubly-linked list, where a path name corresponding to the LIN can be obtained.

When an existing entry in the LRU cache is accessed, the corresponding node can be moved to a front of the doubly-linked list by updating various pointers between nodes in the doubly-linked list. When a new entry is to be added to the cache, a new node for this entry (that contains the new path name) can be added to the front of the doubly-linked list, the new LIN can be added to the hash with a pointer to the new node, and a node at the back of the doubly-linked list can be removed (along with removing the corresponding LIN from the hash). A pointer can be maintained by the LRU cache that points to the back of the doubly-linked list, to access a node that is to be removed.

Figure 2B:
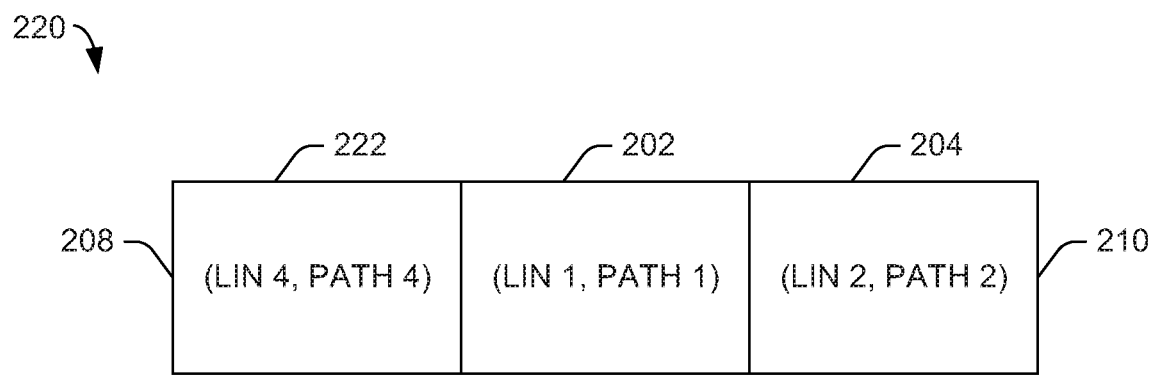
FIG. 2B illustrates a cache, which reflects the example cache of FIG. 2A after adding a new cache entry, in accordance with certain embodiments of this disclosure.

FIG. 2B illustrates a cache 220, which reflects the example cache of FIG. 2A after adding a new cache entry, in accordance with certain embodiments of this disclosure. In some examples, cache 220 can be used to implement path name cache 108 of FIG. 1. Like cache 200, cache 220 contains three entries, which is the maximum size of cache 220 as depicted. Here, a new cache entry—cache entry 222—has been added to the front 208 of cache 220. As a result of adding cache entry 222, cache entry 204 and cache entry 206 have been moved back one spot relative to their respective position in cache 200. Additionally, as a result of adding cache entry 222, relative to cache 200, cache entry 206 has been removed (since it was the least-recently used cache entry, as evidenced by it being positioned at back 210).

Figure 2C:
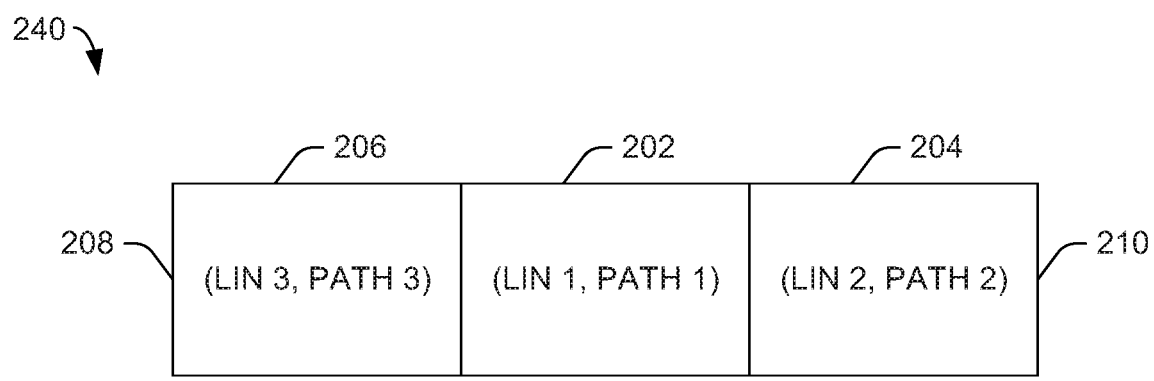
FIG. 2C illustrates a cache, which reflects the example cache of FIG. 2A after accessing an existing cache entry, in accordance with certain embodiments of this disclosure.

FIG. 2C illustrates a cache 240, which reflects the example cache of FIG. 2A after accessing an existing cache entry, in accordance with certain embodiments of this disclosure. In some examples, cache 240 can be used to implement path name cache 108 of FIG. 1. Since, as depicted, accessing an existing cache entry does not involve adding a new cache entry, there is not a cache entry that has been removed relative to cache 200 (since there is not a new cache entry to be added, for which space in the cache is to be made).

Here, cache entry 206 has been accessed (e.g., because a file or directory that corresponds to cache entry 206 was changed, and a change notify response is to be generated). Since cache entry 206 has been accessed, cache entry 206 has been moved to the front 208 of cache 240. Then, each other cache entry that is depicted (cache entry 202 and cache entry 204) has been moved one spot away from the front in cache 200. If later a new cache entry is added to cache 240, the least-recently used cache entry is cache entry 204, and it is cache entry 204 that can be removed to make room for a new cache entry.

Example Process Flows

FIG. 3 illustrates an example process flow 300 for providing a change notify response for a file create or modify, in accordance with certain embodiments of this disclosure. While a file create or modify is described, it can be appreciated that this is done for the sake of brevity, and that a similar approach can be utilized to provide a change notify response for a directory.

In some embodiments, process flow 300 can be implemented with server 102 of FIG. 1 as server 102 provides a change notify response to client computer 104*a* and/or client computer 104*b*. It can be appreciated that there can be embodiments that implement more or fewer operations than are depicted in process flow 300, and/or that implement the operations depicted in process flow 300 in a different order than are depicted.

The process flow of FIG. 3 begins with 302, and then moves to operation 304. Operation 304 depicts determining that there is a file change. In some examples, cache-aware change notify module 116 of FIG. 1 can monitor file system driver 114 (such as by serving as a filter driver, or otherwise serving as a listener for file system events) for changes that are to be made to a file or directory in file system 118. Where cache-aware change notify module 116 identifies that a change is to be made to a file or directory in file system 118 that cache-aware change notify module 116, this identification can serve as determining that there is a file change in operation 304. After operation 304, the process flow of FIG. 3 moves to operation 306.

Operation 306 depicts determining whether the file change is a create or a modify. Continuing with the example given with respect to operation 304, where cache-aware change notify module 116 identifies that a change is to be made to a file or directory in file system 118, cache-aware change notify module 116 can also determine the nature of the change—e.g., if this change constitutes a create or modify to the file or directory.

Where it is determined in operation 306 that the file change is a create or a modify, then the process flow of FIG. 3 moves to operation 308. Instead, where it is determined in operation 306 that the file change is not a create or a modify, then the process flow of FIG. 3 moves to 318, where the process flow of FIG. 3 ends.

Operation 308 is reached from operation 306 where it is determined in operation 306 that the file change is a create or a modify. Operation 308 depicts determining whether a LIN for the file that is changed is found in a cache. In some examples, the cache maintains one or more (LIN, path name) pairs, where the LIN can serve as a key for the path name In such examples, the cache can be queried for an entry that contains the LIN. Where a path name is returned, it can be determined that a LIN for the file that is changed is located in the cache. Where a path name is not returned (e.g., a "path name not found" message is returned), it can be determined that a LIN for the file that is changed is not located in the cache.

Where it is determined in operation 308 that a LIN for the file that is changed is located in the cache, then the process flow of FIG. 3 moves to operation 310. Instead, where it is determined in operation 308 that a LIN for the file that is changed is not located in the cache, then the process flow of FIG. 3 moves to operation 312.

Operation 310 is reached from operation 308 where it is determined in operation 308 that a LIN for the file that is changed is found in the cache. Operation 310 depicts retrieving a path name for the file from the cache. Where determining whether or not a LIN is located in the cache involves returning either a path name that corresponds to the LIN or a "path name not found" message, such as described with respect to operation 308, then retrieving the path name for the file from the cache can comprise utilizing the path name that was returned in operation 308. After operation 310, the process flow of FIG. 3 moves to operation 316.

Operation 312 is reached from operation 308 where it is determined in operation 308 that a LIN for the file that is changed is not found in the cache. Operation 312 depicts making a lin_get_path( ) API call. An example of a lin_get_path( ) API call is described with respect to FIG. 1, and can be utilized, e.g., by cache-aware change notify module 116 (which can implement at least some of the operations of process flow 300) to determine a path name for a file that is stored in file system 118.

After operation 312, the process flow of FIG. 3 moves to operation 314.

Operation 314 depicts storing a LIN and path name for the file that is changed in the cache. Having retrieved a path name for a file in operation 312, a path name and LIN for the file can be stored in the cache for later use, such as to produce a change notify response, or to again access the path name information in a way that can be less computationally expensive than making another lin_get_path( ) API call. After operation 314, the process flow of FIG. 3 moves to operation 316.

Operation 316 is reached from each of operation 310 and operation 314. Operation 316 depicts sending a change notify response. This change notify response can be created using path name information stored in the cache. This change notify response can indicate to a remote computer that a particular file or directory has been changed, and the nature of the change (e.g., create, modify, rename, or delete). After operation 316, the process flow of FIG. 3 moves to 318, where the process flow of FIG. 3 ends.

FIG. 4 illustrates an example process flow 400 for providing a change notify response for a file rename, in accordance with certain embodiments of this disclosure. While a file rename is described, it can be appreciated that this is done for the sake of brevity, and that a similar approach can be utilized to provide a change notify response for a directory.

It can also be appreciated that there can be embodiments where file renames and directory renames are handled differently. For example, an approach to a directory rename can be to search for all Modes that are part of the directory (e.g., an Mode for a file contained within the directory) inside of the cache and remove those associated cache entries from the cache (or otherwise invalidate the cache entries for these Modes). Another example approach to a directory rename can be to remove all entries from the cache (or otherwise invalidate all entries; this can be referred to as flushing the cache). Where renaming a directory is rare, there can be embodiments where it is less computationally expensive to flush the cache relative to invalidating a part of the cache entries in the cache.

In some embodiments, process flow 400 can be implemented with server 102 of FIG. 1 as server 102 provides a change notify response to client computer 104a and/or client computer 104b. It can be appreciated that there can be embodiments that implement more or fewer operations than are depicted in process flow 400, and/or that implement the operations depicted in process flow 400 in a different order than are depicted.

The process flow of FIG. 4 begins with 402, and then moves to operation 404. Operation 404 depicts determining that there is a file change. In some embodiments, operation 404 can be implemented in a similar manner as operation 304 of FIG. 3. After operation 404, the process flow of FIG. 4 moves to operation 406.

Operation 406 depicts determining whether the file change is a rename. In some embodiments, operation 406 can be implemented in a similar manner as operation 306 of FIG. 3, but with analyzing the file change for whether it is a rename, as opposed to whether it is a create or a modify.

Where it is determined in operation 406 that the file change is a rename, then the process flow of FIG. 4 moves to operation 408. Instead, where it is determined in operation 406 that the file change is not a create or a modify, then the process flow of FIG. 4 moves to 418, where the process flow of FIG. 4 ends.

Operation 408 is reached from operation 406 where it is determined in operation 306 that the file change is a rename. Operation 408 depicts determining whether a LIN for the file that is changed is found in a cache. In some examples, operation 408 can be implemented in a similar manner as operation 308 of FIG. 3.

Where it is determined in operation 408 that a LIN for the file that is changed is located in the cache, then the process flow of FIG. 4 moves to operation 410. Instead, where it is determined in operation 408 that a LIN for the file that is changed is not located in the cache, then the process flow of FIG. 4 moves to operation 412.

Operation 410 is reached from operation 408 where it is determined in operation 408 that a LIN for the file that is changed is found in the cache. Operation 410 depicts removing an entry for the file from the cache. For example, the cache can be implemented with a hash and a doubly-linked list as described with respect to FIG. 2A. In such an example, an entry for the file can be removed from the cache as follows. A node (this can be two nodes) that points (or links) to the node for this entry can remove its pointer to this entry. A data structure for the node that contains this entry can be deleted. And a LIN located in the hash for this entry can be removed, as well. After operation 410, the process flow of FIG. 4 moves to operation 412.

Operation 412 is reached from operation 408 where it is determined in operation 408 that a LIN for the file that is changed is not located in the cache, and also from operation 410. Operation 412 depicts making a lin_get_path( ) API call. In some examples, operation 412 can be implemented in a similar manner as operation 312 of FIG. 3. After operation 412, the process flow of FIG. 4 moves to operation 414.

Operation 414 depicts storing a LIN and path for the file that is changed in the cache. In some examples, operation 414 can be implemented in a similar manner as operation 314 of FIG. 3. After operation 414, the process flow of FIG. 4 moves to operation 416.

Operation 416 depicts sending a change notify response. In some examples, operation 416 can be implemented in a similar manner as operation 316 of FIG. 3. After operation 416, the process flow of FIG. 4 moves to 418, where the process flow of FIG. 4 ends.

FIG. 5 illustrates an example process flow 500 for providing a change notify response for a file delete, in accordance with certain embodiments of this disclosure. While a file delete is described, it can be appreciated that this is done for the sake of brevity, and that a similar approach can be utilized to provide a change notify response for a directory.

In general, an approach to handling a delete event can be taken where a LIN can be reused. Where a LIN can be reused, and a file (and its associated LIN) is deleted before a change notify response is generated, the LIN for this deleted file can have been reused already, and refer to a different file. Thus, communicating with the kernel for path name information for the file (e.g., via a lin_get_path( ) API call) can involve using this reused LIN, and produce the incorrect path name for the deleted file. The use of a path name cache as described herein can mitigate against this issue with a reused LIN in generating a change notify response.

In some embodiments, process flow 500 can be implemented with server 102 of FIG. 1 as server 102 provides a change notify response to client computer 104a and/or client computer 104b. It can be appreciated that there can be embodiments that implement more or fewer operations than are depicted in process flow 500, and/or that implement the operations depicted in process flow 500 in a different order than are depicted.

The process flow of FIG. 5 begins with 502, and then moves to operation 504. Operation 504 depicts determining that there is a file change. In some examples, operation 504 can be implemented in a similar manner as operation 304 of FIG. 3. After operation 504, the process flow of FIG. 5 moves to operation 506.

Operation 506 depicts determining whether the file change is a delete. In some embodiments, operation 506 can be implemented in a similar manner as operation 306 of FIG. 3, but with analyzing the file change for whether it is a delete, as opposed to whether it is a create or a modify.

Where it is determined in operation 506 that the file change is a delete, then the process flow of FIG. 5 moves to operation 508. Instead, where it is determined in operation 506 that the file change is not a create or a modify, then the process flow of FIG. 5 moves to 518, where the process flow of FIG. 5 ends.

Operation 508 is reached from operation 506 where it is determined in operation 306 that the file change is a delete. Operation 508 depicts determining whether a LIN for the file that is changed is found in a cache. In some examples, operation 508 can be implemented in a similar manner as operation 304 of FIG. 3.

Where it is determined in operation 508 that a LIN for the file that is changed is located in the cache, then the process flow of FIG. 5 moves to operation 510. Instead, where it is determined in operation 508 that a LIN for the file that is changed is not located in the cache, then the process flow of FIG. 5 moves to operation 514.

Operation 510 is reached from operation 508 where it is determined in operation 508 that a LIN for the file that is changed is found in the cache. Operation 510 depicts sending a change notify response. In some examples, operation 510 can be implemented in a similar manner as operation 316 of FIG. 3. After operation 510, the process flow of FIG. 5 moves to operation 512.

Operation 512 depicts removing an entry for the file from the cache. In some examples, operation 512 can be implemented in a similar manner as operation 410 of FIG. 4. After operation 512, the process flow of FIG. 5 moves to 518, where the process flow of FIG. 5 ends.

Operation 514 is reached from operation 508 where it is determined in operation 508 that a LIN for the file that is changed is not located in the cache. Operation 514 depicts making a lin_get_path( ) API call. In some examples, operation 514 can be implemented in a similar manner as operation 312 of FIG. 3. After operation 514, the process flow of FIG. 5 moves to operation 516.

Operation 516 depicts sending a change notify response. In some examples, operation 516 can be implemented in a similar manner as operation 316 of FIG. 3. After operation 516, the process flow of FIG. 5 moves to 518, where the process flow of FIG. 5 ends.

FIG. 6 illustrates an example process flow 600 for a path name cache for notifications of file changes, in accordance with certain embodiments of the disclosure. While a file delete is described, it can be appreciated that this is done for the sake of brevity, and that a similar approach can be utilized to provide a change notify response for a directory.

In some embodiments, the system comprising a processor described in process flow 600 can be implemented with server 102 of FIG. 1 as server 102 provides a change notify response to client computer 104a and/or client computer 104b. It can be appreciated that there can be embodiments that implement more or fewer operations than are depicted in process flow 500, and/or that implement the operations depicted in process flow 500 in a different order than are depicted.

Operation 602 depicts, in response to receiving, by a system comprising a processor, a request to delete a file, retrieving an identifier of a path to the file that is stored in a cache. This request to delete a file can be originated by a user space module of the system. For example, this user space module can be a module that interfaces with client computer 104a as client computer 104a accesses various files of server 102, and as client computer 104a indicates to delete a file that is stored by server 102. Then, a module that processes change notify responses, such as cache-aware change notify module 116 can determine that there is—or receive an indicator of—a request to delete the file. In response to this, cache-aware change notify module 116 can retrieve an identifier of the path to the file that is stored in the cache (e.g., path name cache 112), using a LIN for the file as an identifier that is used to retrieve a corresponding path name. In some examples, the cache comprises a least-recently-used data structure that is stored in the distributed storage system.

In some examples, operation 602 can comprise receiving a request to delete a file stored in a distributed storage system, and, in response to receiving the request to delete the file, retrieving an identifier of a path to the file that is stored in a cache. In some examples, operation 602 can comprise, in response to determining to delete a file, retrieving an identifier of a path to the file that is stored in a cache, resulting in a retrieved identifier.

Operation 604 depicts, after retrieving the identifier of the path to the file resulting in a retrieved identifier, removing, by the system, the identifier of the path to the file from the cache. In some examples, the identifier of the path to the file can be removed from the cache after retrieving the retrieved identifier, and before creating or sending the corresponding change notify response. In other examples, the identifier of the path to the file can be removed can be removed after creating the change notify response and before sending the change notify response, or after sending the change notify response.

In some examples, operation 604 comprises, after the retrieving the identifier of the path to the file, removing the identifier of the path to the file from the cache, and generating an indication that the file has been deleted based on the identifier of the path to the file. In some examples, operation 604 comprises, after retrieving the identifier of the path to the file, removing the identifier of the path to the file from the cache.

Operation 606 depicts sending, by the system, an indication that the file is deleted to a second system external to the system, the indication that the file is deleted being created from the retrieved identifier of the path to the file.

In some examples, operation 606 comprises sending the indication that the file has been deleted to a device external to the distributed storage system. In some examples, operation 606 comprises sending the indication that the file has been deleted to multiple devices external to the distributed storage system, the multiple devices including the device. For instance, server 102 of FIG. 1 can send a change notify response for a particular file deletion to both client computer 104a and client computer 104b.

In some examples, the request is a first request, the file is a first file, the identifier is a first identifier, the path is a first path, and operation 606 comprises, in response to receiving a second request to create a second file stored in the distributed storage system, populating the cache with a second identifier of a second path to the second file. That is, upon a file creation event for another file, an entry for this file creation event can be stored in the cache, with this entry comprising the second identifier of a second path to the second file, as well as possibly comprising third identifier to a LIN to the second file. In some examples, the third identifier to the LIN to the second file serves as a key to access the second identifier of the second path to the second file in the cache.

In some examples, operation 606 comprises, in response to receiving a second request to create a second file stored in the distributed storage system when the cache is full, removing a least-recently used entry in the cache, and populating the cache with a second identifier of a second path to the second file. Where a LRU cache is implemented as a path name cache, the LRU cache can have a maximum number of entries. When the LRU cache is full because it is storing this maximum number of entries, then the addition of a new entry can prompt the removal of another entry, which is the least-recently used entry in the LRU cache.

In some examples, operation 606 comprises sending the indication that the file is deleted in accordance with an application-layer network protocol. In some examples, this application-layer network protocol can comprise a SMB protocol, and operation 606 can comprise sending the indication that the file is deleted in accordance with a SMB protocol.

In some examples, operation 606 comprises sending an indication that the file is deleted to a device external to the distributed storage system, the indication that the file is deleted being created from the retrieved identifier of the path to the file. That is, a path name for the file can be retrieved from the cache and then can be used to generate an indication that the file is deleted (e.g., a change notify response).

Example Operating Environments

To provide further context for various aspects of the subject specification, FIGS. 7 and 8 illustrate, respectively, a block diagram of an example distributed file storage system 700 that employs tiered cloud storage and block diagram of a computer 802 operable to execute the disclosed storage architecture in accordance with aspects described herein. For example, aspects of distributed file storage system 700 and computer 802 can be used to implement server 102 of FIG. 1, and aspects of computer 802 can be used to implement client computer 104a and client computer 104b of FIG. 1.

Referring now to FIG. 7, there is illustrated an example local storage system including cloud tiering components and a cloud storage location in accordance with implementations of this disclosure. Client device 702 can access local storage system 790. Local storage system 790 can be a node and cluster storage system such as an EMC Isilon Cluster that operates under OneFS operating system. Local storage system 790 can also store the local cache 792 for access by other components. It can be appreciated that the systems and methods described herein can run in tandem with other local storage systems as well.

As more fully described below with respect to redirect component 710, redirect component 710 can intercept operations directed to stub files. Cloud block management component 720, garbage collection component 730, and caching component 740 may also be in communication with local storage system 790 directly as depicted in FIG. 7 or through redirect component 710. A client administrator component 704 can use an interface to access the policy component 750 and the account management component 760 for operations as more fully described below with respect to these components. Data transformation component 770 can operate to provide encryption and compression to files tiered to cloud storage. Cloud adapter component 780 can be in communication with cloud storage 795$_1$ and cloud storage 795$_N$, where N is a positive integer. It can be appreciated that multiple cloud storage locations can be used for storage including multiple accounts within a single cloud storage location as more fully described in implementations of this disclosure. Further, a backup/restore component 785 can be utilized to back up the files stored within the local storage system 790.

Cloud block management component 720 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, can be still stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 720 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 760 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 720 based on list of mappings it manages. For example, each stub can be associated with an account, and the cloud block management component 720 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 780 manages the sending and receiving of data to and from the cloud service providers. The cloud adapter component 780 can utilize a set of APIs. For example, each cloud service provider may have provider specific API to interact with the provider.

A policy component 750 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 730. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 730 can be used to determine which files/objects/data constructs remaining in both local storage and cloud storage can be deleted. In one implementation, the resources to be managed for garbage collection include cloud metadata objects (CMOs), cloud data objects (CDOs) (e.g., a cloud object containing the actual tiered content data), local cache data, and cache state information.

A caching component 740 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 720, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 740 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data can be represented by clear, adding existing file information to the cache can be represented by fill, adding new information to the cache by write, reading information from the cache can be represented by read following a fill, updating existing file information to the cache can be represented by fill followed by a write, and truncating cache due to file operation can be represented by sync and then a partial clear.

In one implementation, the caching component 740 can track any operations performed on the cache. For example, any operation touching the cache can be added to a queue prior to the corresponding operation being performed on the cache. For example, before a fill operation, an entry can be placed on an invalidate queue as the file and/or regions of the file will be transitioning from an uncached state to cached state. In another example, before a write operation, an entry can be placed on a synchronization list as the file and/or regions of the file will be transitioning from cached to cached-dirty. A flag can be associated with the file and/or regions of the file to show that it has been placed in a queue, and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be requeued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream (ADS). It can be appreciated that ADS can be based on the New Technology File System (NTFS) ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tacking tree can be used to verify that the cache state for the cache region is not "not cached;" (4) data can be read from the cache region; (5) the shared lock on the cache region can be deactivated; and (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached," the region can be filled; (7) the cache tracking tree can updated to mark the cache region as dirty; (8) the data can be written to the cache region; and (9) the lock can be deactivated.

In one implementation, data can be cached at the time of a first read. For example, if the state associated with the data range called for in a read operation is non-cached, then this can be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 770 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 797 can transfer a copy of the files within the local storage system 790 to another cluster (e.g., target cluster). Further, the backup/restore component 797 can manage synchronization between the local storage system 790 and the other cluster, such that, the other cluster is timely updated with new and/or modified content within the local storage system 790.

FIG. 8 illustrates a block diagram of a computer 802 operable to execute the disclosed communication architecture. To provide additional context for various aspects of the disclosed subject matter, FIG. 8 and the following discussion are intended to provide a brief, general description of a suitable computing environment 800 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 8, the example environment 800 for implementing various aspects of the specification includes a computer 802, the computer 802 including a processing unit 804, a system memory 806 and a system bus 808. As an example, the component(s), server(s), node(s), cluster(s), system(s), and/or device(s) disclosed herein can each include at least a portion of the computer 802. The system bus 808 can couple system components including, but not limited to, the system memory 806 to the processing unit 804. The processing unit 804 can be any of various commercially-available or custom processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 can include ROM 810 and RAM 812. A basic input/output system (BIOS) can be stored in ROM 810 or other non-volatile memory, erasable programmable read-only memory (EPROM), EEPROM, where the BIOS can contain the basic routines that help to transfer information between elements within the computer 802, such as during startup. The RAM 812 can also include a high-speed RAM such as static RAM for caching data.

The computer 802 further includes an internal hard disk drive (HDD) 814, which internal hard disk drive 814 can also be configured for external use in a suitable chassis (not shown), a magnetic floppy disk drive (FDD) 816, (e.g., to read from or write to a removable diskette 818) and an optical disc drive 820, (e.g., reading a CD-ROM disc 822 or, to read from or write to other high capacity optical media such as the DVD). The hard disk drive 814, magnetic disk drive 816 and optical disc drive 820 can be connected to the system bus 808 by a hard disk drive interface 824, a magnetic disk drive interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 802, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 812, including an operating system 830, one or more application programs 832, other program modules 834 and program data 836. All or portions of the operating system, applications, modules, and/or data can also be cached in the RAM 812. It is appreciated that the specification can be implemented with various commercially available operating systems or combinations of operating systems.

A user can enter commands and information into the computer 802 through one or more wired or wireless input devices, e.g., a keyboard 838 and/or a pointing device, such as a mouse 840 or a touch screen or touchpad (not illustrated). These and other input devices can be connected to the processing unit 804 a serial port interface 842 that is coupled to the system bus 808, but can be connected by other interfaces, such as a parallel port, an IEEE 1394 port, a game port, a USB port, an infrared (IR) interface, etc. A monitor 844 or other type of display device can also be connected to the system bus 808 via an interface, such as a video adapter 846.

The computer 802 can operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and can include many or all the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments can be commonplace in offices and companies, and facilitate enterprise-wide computer networks, such as intranets, all of which can connect to a global communications network, e.g., the Internet.

When used in a LAN networking environment, the computer 802 is connected to the LAN 852 through a wired and/or wireless communication network interface or adapter 856. The adapter 856 can facilitate wired or wireless communication to the LAN 852, which can also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, can be connected to the system bus 808 via the serial port interface 842. In a networked environment, program modules depicted relative to the computer 802, or portions thereof, can be stored in the remote memory/storage device 850. It will be appreciated that the network connections shown are example and other means of establishing a communications link between the computers can be used.

The computer 802 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a request to delete a specified file stored in a node of a distributed storage system;
in response to receiving the request to delete the specified file, retrieving, from a cache, a first identifier of a first path to the specified file, the cache being separate from the specified file;
after the retrieving the first identifier of the first path to the specified file, removing the first identifier of the first path to the specified file from the cache;
generating an indication that the specified file has been deleted based on the first identifier of the first path to the specified file;
sending the indication that the specified file has been deleted to a device external to the distributed storage system; and
in response to receiving a request to create another specified file stored in the distributed storage system, populating the cache with a second identifier of a second path to the other specified file, and with a third identifier to a data structure that stores metadata about the other specified file.

2. The system of claim 1, wherein the sending the indication that the specified file has been deleted to the device external to the distributed storage system further comprises:
sending the indication that the specified file has been deleted to multiple devices external to the distributed storage system, the multiple devices including the device.

3. The system of claim 1, wherein the cache comprises a least-recently-used data structure that is stored in the distributed storage system.

4. The system of claim 1, wherein the third identifier to the data structure that stores metadata about the other specified file serves as a key to access the second identifier of the second path to the other specified file in the cache.

5. The system of claim 1, wherein the operations further comprise:
in response to receiving a request to modify a different specified file other than the specified file and the other specified file and stored in the distributed storage system, populating the cache with a fourth identifier of a third path to the different specified file.

6. The system of claim 1, wherein the operations further comprise:
in response to receiving a request to rename a different specified file other than the specified file and the other specified file and stored in the distributed storage system, removing a fourth identifier of a third path to the different specified file from the cache.

7. The system of claim 1, wherein the generating the indication that the specified file has been deleted based on the first identifier of the first path to the specified file is performed independently of having deleted the specified file.

8. A method, comprising:
in response to receiving, by a system comprising a processor, a request to delete a specified file stored in a node of a distributed storage system, retrieving, from a cache, a first identifier of a first path to the specified file, the cache being separate from the specified file;

after retrieving the first identifier of the first path to the specified file resulting in a retrieved identifier, removing, by the system, the first identifier of the first path to the specified file from the cache;

sending, by the system, an indication that the specified file is deleted to a second system external to the system, the indication that the specified file is deleted being created from the retrieved first identifier of the first path to the specified file; and in response to receiving a request to create another specified file, populating, by the system, the cache with a second identifier of a path to the other specified file, and with a third identifier to a data structure that stores metadata about the other specified file.

9. The method of claim 8, further comprising:

in response to receiving the request to create the other specified file when the cache is full, removing a least-recently used entry in the cache.

10. The method of claim 8, wherein sending the indication that the specified file is deleted to the second system external to the system comprises:

sending the indication that the specified file is deleted in accordance with an application-layer network protocol.

11. The method of claim 8, wherein sending the indication that the specified file is deleted to the second system external to the system comprises:

sending the indication that the specified file is deleted in accordance with a server message block (SMB) protocol.

12. The method of claim 8, wherein the indication that the specified file is deleted comprises a server message block (SMB) change notify response in accordance with an SMB protocol.

13. The method of claim 8, wherein the third identifier to the data structure that stores metadata about the other specified file serves as a key to access the second identifier of the second path to the other specified file in the cache.

14. The method of claim 8, further comprising:

generating, by the system, the indication that the specified file has been deleted based on the first identifier of the first path to the specified file is performed independently of having deleted the specified file.

15. A non-transitory computer-readable medium comprising instructions that, in response to execution, cause a system comprising a processor to perform operations, comprising:

in response to determining to delete a first specified file stored in a node of a distributed storage system, retrieving, from a cache, a first identifier of a first path to the first specified file, resulting in a retrieved first identifier, the cache being separate from the first specified file;

sending an indication that the first specified file is deleted to a device external to the system, the indication that the first specified file is deleted being created from the retrieved first identifier of the first path to the first specified file; and in response to receiving a request to create a specified file stored in the distributed storage system, populating the cache with a second identifier of a second path to the specified file, and with a third identifier to a data structure that stores metadata about the specified file.

16. The non-transitory computer-readable medium of claim 15, wherein the operations further comprise:

after retrieving the first identifier of the first path to the first specified file, removing the first identifier of the first path to the first specified file from the cache.

17. The non-transitory computer-readable medium of claim 15, wherein the operations further comprise:

in response to receiving a request to modify a specified file stored in the system, populating the cache with a fourth identifier of a third path to the specified file.

18. The non-transitory computer-readable medium of claim 15, wherein the operations further comprise:

in response to receiving a request to rename a specified file stored in the system, removing a fourth identifier of a third path to the specified file from the cache.

19. The non-transitory computer-readable medium of claim 15, wherein the operations further comprise:

in response to receiving a request to create a specified file stored in the system when the cache is full, removing a least-recently used entry in the cache, and populating the cache with a fourth identifier of a third path to the specified file.

20. The non-transitory computer-readable medium of claim 15, wherein the operations further comprise:

generating the indication that the first specified file has been deleted based on the first identifier of the first path to the first specified file is performed independently of having deleted the first specified file.

* * * * *